US011181218B2

(12) United States Patent
Danelli et al.

(10) Patent No.: US 11,181,218 B2
(45) Date of Patent: Nov. 23, 2021

(54) HYDRAULIC AND/OR PNEUMATIC CONNECTOR, IN PARTICULAR OF THE MULTIPLE CONNECTION TYPE

(71) Applicant: Faster S.P.A., Rivolta d'Adda (IT)

(72) Inventors: Alessandro Danelli, Brignano Gera d'Adda (IT); Massimo Cardi, Pandino (IT); Marco Neri, Rivolta d'Adda (IT)

(73) Assignee: FASTER S.P.A., Rivolta d'Adda (IT)

( * ) Notice: Subject to any disclaimer, the term of this patent is extended or adjusted under 35 U.S.C. 154(b) by 587 days.

(21) Appl. No.: 16/138,368

(22) Filed: Sep. 21, 2018

(65) Prior Publication Data

US 2019/0093808 A1    Mar. 28, 2019

(30) Foreign Application Priority Data

Sep. 28, 2017   (EP) ..................................... 17193727

(51) Int. Cl.
*F16L 37/20*     (2006.01)
*F16L 37/18*     (2006.01)
(Continued)

(52) U.S. Cl.
CPC ............... *F16L 37/20* (2013.01); *F16L 37/18* (2013.01); *F16L 37/56* (2013.01); *F16L 55/1015* (2013.01); *F16L 2201/10* (2013.01)

(58) Field of Classification Search
CPC . F16L 37/20; F16L 37/18; F16L 37/56; F16L 39/00; F16L 2201/10;
(Continued)

(56) References Cited

U.S. PATENT DOCUMENTS

| 5,082,245 A   | * | 1/1992 | Kast ...................... F15B 20/005 |
| | | | 137/327 |
| 2011/0198840 A1 | * | 8/2011 | Sorbi ...................... F16L 37/16 |
| | | | 285/81 |
| 2017/0202128 A1 | | 7/2017 | Emmert et al. |

FOREIGN PATENT DOCUMENTS

| DE | 102009056071 | 6/2011 |
| EP | 2884146 A1 | 6/2015 |

* cited by examiner

*Primary Examiner* — Matthew Troutman
*Assistant Examiner* — James A Linford
(74) *Attorney, Agent, or Firm* — Stetina Brunda Garred and Brucker

(57) ABSTRACT

A hydraulic and/or pneumatic connector, said connector comprising a fixed part adapted to constitute the end part of a first hydraulic circuit of a main operating machine and to be fixed to said main operating machine, said fixed part comprising at least one first male or female hydraulic coupling, said connector comprising a movable part intended to constitute the end part of a second hydraulic circuit of a piece of equipment, said movable part comprising at least one second hydraulic coupling, respectively either female or male, where said at least one first hydraulic coupling of said fixed part and at least one second hydraulic coupling of said movable part are adapted to be hydraulically connected so as to achieve the hydraulic connection between said first and second hydraulic circuits of said male operating machine and said equipment, respectively, said connector comprising mechanical constraint means which can be switched between a first configuration or position and a second configuration or position, where the switching of said mechanical constraints in said second configuration or position translates into the mechanical constraining of said fixed part and said movable part and in the hydraulic connection between said first coupling and said second
(Continued)

coupling, of said fixed part and of said movable part, respectively. and where the switching of said constraint means in said first position or configuration translates into the possibly of mechanically releasing said fixed part and said movable part and of hydraulically disconnecting said first coupling and said second coupling of said fixed part and said movable part, respectively.

10 Claims, 12 Drawing Sheets

(51) Int. Cl.
*F16L 37/56* (2006.01)
*F16L 55/10* (2006.01)

(58) Field of Classification Search
CPC ........ F16L 55/1015; F16L 21/00; B60D 1/64; A01C 7/082; A01C 23/005
See application file for complete search history.

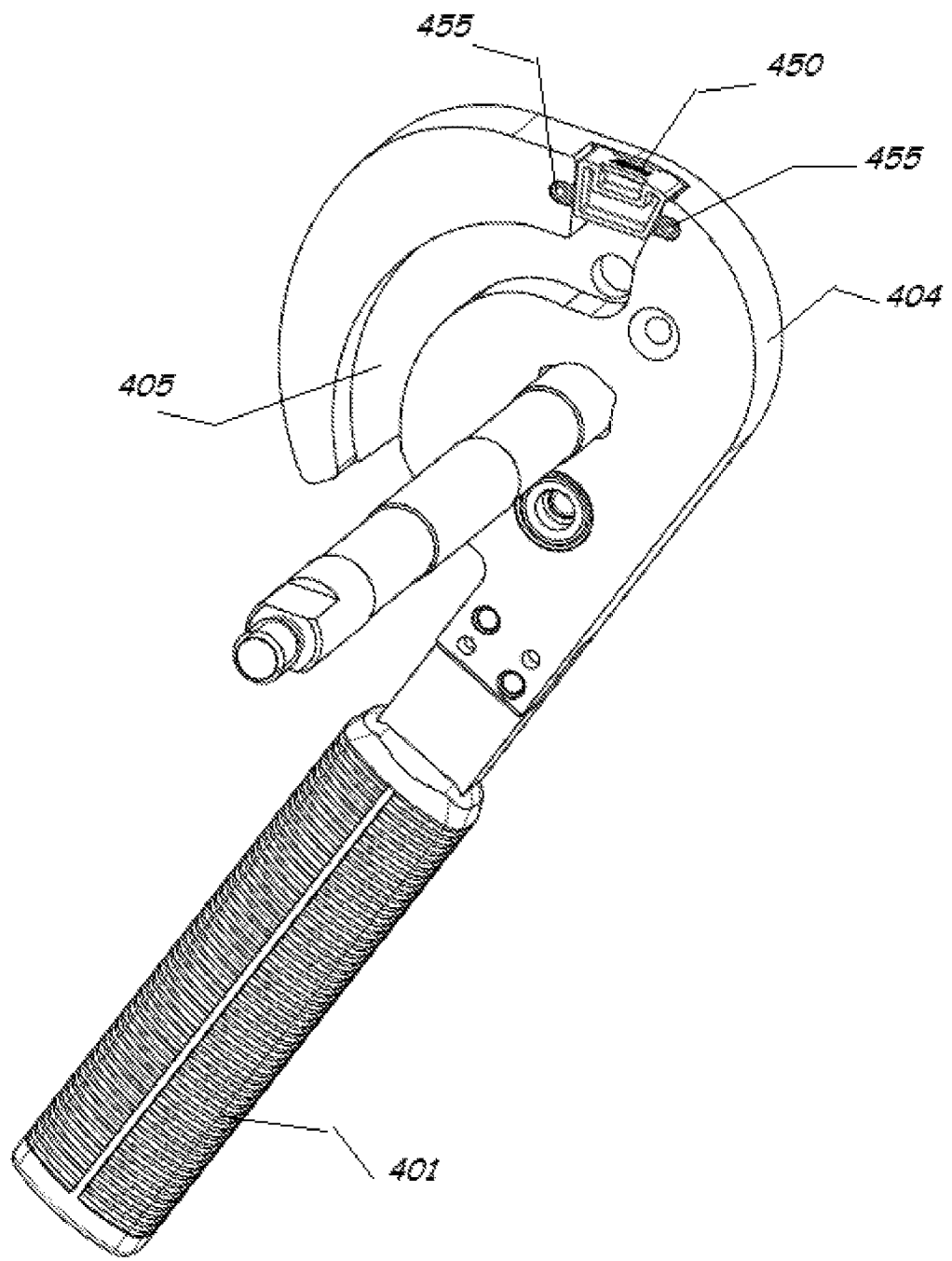
FIG.8bis

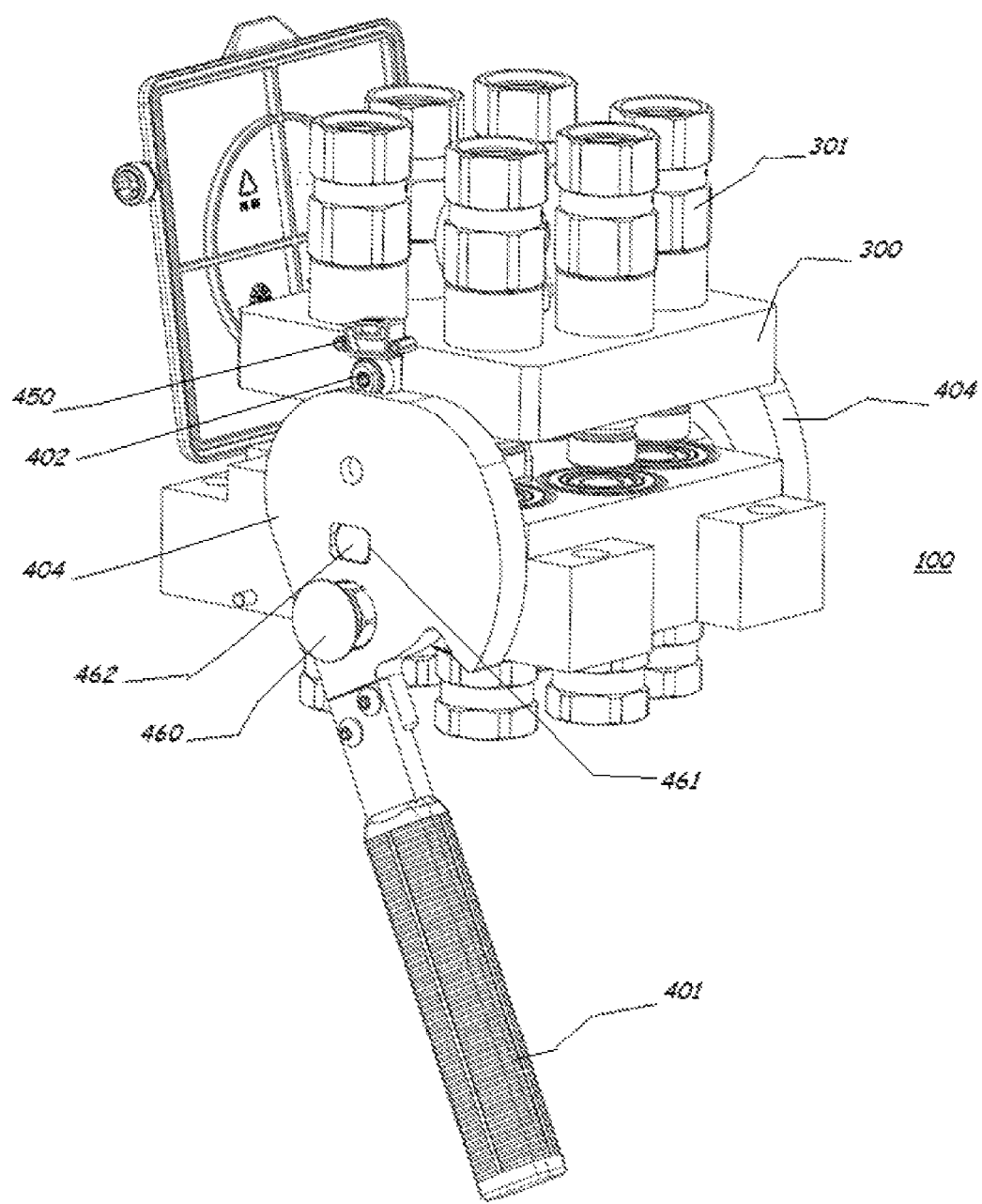
FIG.10bis

HYDRAULIC AND/OR PNEUMATIC CONNECTOR, IN PARTICULAR OF THE MULTIPLE CONNECTION TYPE

CROSS REFERENCE TO RELATED APPLICATION(S)

The present application claims priority to European Patent Application No. 17193727.9 filed Sep. 28, 2017, the entirety of the disclosures of which are expressly incorporated herein by reference.

STATEMENT RE: FEDERALLY SPONSORED RESEARCH/DEVELOPMENT

Not Applicable.

Technical Field

The present invention relates to the field of connectors for hydrodynamic and/or pneumatic applications, in particular for hydraulic and/or pneumatic circuits and the like. In particular, the present invention relates to a connector assembly for hydrodynamic and/or pneumatic applications of the type indicated above. In detail, the present invention relates to a connector assembly of the multiple connection type, i.e. adapted to allow the simultaneous hydraulic connection and disconnection of a plurality of male type couplings respectively to and from a corresponding plurality of female type couplings. More in detail, the present invention relates to a solution adapted to allow the disconnection of the male and female type couplings without breakages or without damaging the parts of the connector.

Background Art

Quick connectors for reciprocally connecting hydraulic circuits by means of flexible and/or rigid pipes are known in prior art. For example, multiple connection type quick connectors are known in the farming sector for reciprocally connecting the hydraulic circuits of a main tractor and of a tool (e.g. of the front loader, but also of a towed tool or one fixed to the rear lifter) respectively, where the hydraulic connection and disconnection of the female and male couplings is performed by mechanically connecting and disconnecting a fixed part and a movable part of the connector assembly, respectively.

An example of connector assembly of the multiple connection type according to the prior art is depicted in FIGS. 1 to 3.

As depicted, the connector assembly 100 comprises a movable part 300 intended to constitute the end part of the hydraulic circuit of a piece of equipment (e.g. a front loader), and a fixed part 200 intended to constitute the end part of the hydraulic circuit of a main operating machine (e.g. a farming tractor) and (possibly but not necessarily) to be fixed to said main operating machine.

Again as depicted, the movable part 300 is equipped with a plurality of couplings 301 (of male type in the particular case shown, but connector assemblies in which the movable part 300 is equipped with female type couplings are also known), where the fixed part 200 is equipped with a corresponding plurality of couplings 201 (of male or female type, according to the type of couplings of the movable part 300, either female or male, respectively).

Each of the couplings 201 and 301 is intended to constitute the end part of a pipe of hydraulic circuits of the equipment and of the main operating machine, respectively.

The fixed part 200 is further provided with a lever 401 adapted to be switched by rotation in the two opposite senses of rotation indicated by the double arrow in FIGS. 1 to 3, wherein the rotation of the lever 401 translates into the rotation in the same sense of rotation as a pair of plates or cams P1 and P2, each of which defines a corresponding engaging groove G1 and G2. The movable part 300 is instead provided with a pair of pawls or pins N1, N2 (only one of which is depicted in the figures).

The mechanical connection of the movable part 300 and of the fixed part 200, with consequent simultaneously hydraulic connection of the respective couplings 301 and 201, occurs as follows.

With the lever 401 and the plates or cams P1 and P2 in the position of FIG. 1 (first end position of the lever 401), the movable part 300 is approached (in practice positioned frontally or in all cases made to correspond and/or mate) with the fixed part 200, being careful to position each coupling 301 at the corresponding coupling 201; this operation is facilitated by guide means Gm (protruding pins) and Gf (corresponding housings, not shown) respectively of the movable part 300 and of the fixed part 200, the reciprocal engaging of which translates into the correct positioning of the movable part 300 and of the fixed part 200. With the movable part 300 and fixed part 200 positioned as described above, the rotation of the lever 401 away from the first end position in FIG. 1 (and thus clockwise with respect to FIGS. 1 and 2), translates into the engaging of the pawls N1 and N2 by the engaging grooves G1 and G2 of the plates or cams P1 and P2, respectively.

Therefore, as shown, the further rotation of the lever 401 moving further away from the first end (limit stop) position to the reaching of the second end (limit stop) position in FIG. 3, translates, by virtue of the conformation of the grooves G1 and G2, each with an arc or cam development, into the definitive approach of the movable part 300 and fixed part 200 and into the consequent hydraulic connection of the couplings 301 and 201, wherein in the reciprocal position of FIG. 3, the movable part 300 and the fixed part 200 are mechanically constrained o linked to each other.

Although appreciable from many different points of view, such as for example reliability, construction simplicity, versatility and substantially low cost, connector assemblies according to the prior art of the type described above are not entirely free from drawbacks and/or disadvantages, that the applicant intends to overcome or at least minimize by means of the present invention.

A first drawback relates to the fact that with the movable part 300 and fixed part 200 mechanically constrained (linked) to each other as depicted in FIG. 3, the movable part 300 and the fixed part 200 can be released only and exclusively by re-switching the lever 401 into the first end (limit stop) position, in which the pawls N1 and N2 can be released from the grooves G1 and G2, respectively.

Furthermore, this means that with the movable part 300 and the fixed part 200 constrained (linked) mechanically to one another as depicted in FIG. 3, any action (e.g. pulling) applied to the movable part 300 in order to disconnect it from the fixed part 200 without having preventively re-switched the lever 401 into its first end (limit stop) position, would have as a consequence the damaging of component parts of the movable part 300 and/or fixed part 200.

For example, in the case of accidental detachment of the equipment of the main operating machine, e.g. of a trailer and/or front loader and/or equipment carried by the rear lifting means, the hydraulic pipes of the equipment itself would be inevitably subjected to pulling, with the risk of being severely damaged if not even irreparable torn.

It is further worth noting that in the case of the front loader of a farming tractor, for example, the assembly and/or disassembly operations of the loader respectively to and from the tractor often require moving the tractor with the movable part 300 and of the fixed part 200 of the connector assembly in hydraulic and mechanical connection condition but when the loader is not entirely fixed to the tractor. Also in these conditions, an improper maneuver of the tractor could easily translate into pulling the hydraulic pipes with the consequent risk of damage or even breakage.

DESCRIPTION OF THE PRESENT INVENTION

It is the goal of the present invention to overcome or at least minimize the drawbacks found in the solutions according to the prior art, in particular in the connector assemblies of the multiple connection type.

In particular, it is an objective or goal of the present invention to provide a solution which allows to protect the integrity of the hydraulic pipes hydraulically connected by means of a connector assembly if said pipes are subjected to unusual and accident efforts, in particular pulling. Even more in detail, it is a goal of the present invention to provide a solution which allows to protect the integrity of the hydraulic pipes of the hydraulic circuits of a piece of equipment and of a main operating machine reciprocally connected by means of a connector assembly if said pipes are subjected to unusual and accidental efforts, in particular to pulling, deriving from the accidental detachment of said equipment from said main operating machine.

Furthermore, it is one of the objects of the present invention to provide a solution which, in the case of accidental detachment of a piece of equipment from the respective main operating machine, avoids pulling the hydraulic pipes, but allows at the same time the reciprocal releasing of the movable part 300 and of the fixed part 200 of the connector assembly.

For the purpose, a connector comprising a solution adapted to allow the reciprocal releasing of the fixed and movable parts of a connector with no need to switch the constraint lever will be described below. Considering the drawbacks found in the solutions according to the prior art and the objects summarized above, the present invention suggests a hydraulic and/or pneumatic connector, said connector comprising a first part and a second part, said first part and said second part comprising mechanical constraint means and engaging means, respectively, said constraint means being adapted to be switched between a first position and a second position, wherein the switching of said mechanical constraint means in said second position translates into said constraint means and said engaging means being reciprocally, progressively engaged and in said first part and said second part being mechanically, reciprocally constrained, and wherein the switching of said constraint means in said first position translates into the possibility of mechanically releasing said first part and said second part, said mechanical constraint means comprising a groove, said groove comprising an end portion, wherein the switching of said constraint means into said second position translates into the reciprocal progressive engagement of said groove and said engaging means, and wherein with said first part and said second part in reciprocal constraining condition and with said constraint means in said second switching position, said engaging means are positioned at said end portion of said groove and can translate along said end portion so as to be released from said groove with no need to switch said constraint means into said first position, wherein said connector comprises contrasting and checking means accommodated in said end portion of said groove, and wherein said contrasting and checking means are fixed to said end portion of said groove so as to contrast the translation of said engaging means along said end portion of said groove and thus the reciprocal releasing of said constraint means and said engaging means.

According to an embodiment, said mechanical constraint means comprise a lever which can be switched by rotation, wherein rotation of said lever according a first rotation sense and a second rotation sense results in said constraint means being switched into said first and second positions, respectively.

According to an embodiment, said groove defines a cam shaped engaging surface, wherein switching of said constraint means into said first and second position results in said engaging means being moved along said engaging surface, and wherein with said first part and second part in reciprocal constraining condition and with said constraint means in said second position said engaging surface is released and not engaged by said engaging means.

According to an embodiment, said lever comprises a plate, wherein said groove is formed in said plate.

According to an embodiment, said contrasting and checking means are adapted to be broken and partially removed from said end portion of said groove if subjected to a force of intensity higher than a predetermined intensity and greater than zero.

According to an embodiment, said second part comprises a teether rigidly fixed thereto.

According to an embodiment, said teether is adapted to be engaged by a first end portion of flexible means, such as a cable, a chain or the like, the second end portion of said flexible means being adapted to be fixed for example to a main operating machine.

According to an embodiment, said first part is adapted to constitute the end part of a first hydraulic circuit of a main operating machine and to be fixed to said main operating machine, said first part comprising at least one first male or female hydraulic coupling, said second part being adapted to constitute the end part of a second hydraulic circuit of a piece of equipment, said second part comprising at least one second hydraulic coupling, respectively either female or male, wherein said at least one first hydraulic coupling of said first part and said at least one second hydraulic coupling of said second part are adapted to be hydraulically connected so as to achieve the hydraulic connection between said first and second hydraulic circuits of said main operating machine and said piece of equipment, and wherein switching said mechanical constraint means into said second position results in said first coupling and said second coupling of said first part and said second part, respectively, being hydraulically connected.

According to an embodiment, said first coupling and said second coupling are of the type so that the hydraulic connection of said first coupling and second coupling also implies a mechanical constraint to said first coupling and said second coupling.

The present invention further relates to an operating machine including at least one first hydraulic circuit, said first circuit comprises an end part consisting of the first part of a connector according to one of the above identified embodiments of the present invention.

According to an embodiment, said operating machine being equipped with a piece of equipment comprising a second hydraulic circuit, wherein the end part of said second hydraulic circuit consists of a second part of a connector according to one of the above identified embodiments of the present invention.

According to further embodiment, said connector comprises a fixed part adapted to constitute the end part of a first hydraulic circuit of a main operating machine and to be fixed to said main operating machine, said fixed part comprising at least one first male or female hydraulic coupling, said connector comprising a movable part intended to constitute the end part of a second hydraulic circuit of a piece of equipment, said movable part comprising at least one second hydraulic coupling, either female or male, respectively, wherein said at least one first hydraulic coupling of said fixed part and at least one second hydraulic coupling of said movable part are adapted to be hydraulically connected so as to achieve the hydraulic connection between said first and second hydraulic circuits of said male operating machine and said equipment, respectively, said connector comprising mechanical constraint means which can be switched between a first position and a second position, wherein the switching of said mechanical constraint means into said second position translates into the mechanical constraining of said fixed and movable parts and in the hydraulic connection between said first and second couplings, of said fixed part and of said movable part, respectively, and wherein the switching of said constraint means into said first position translates into the possibility of mechanically releasing said fixed and movable parts and of hydraulically disconnecting said first and second couplings of said fixed and movable parts, respectively, wherein said mechanical constraint means are shaped so as to allow, in said second position, the mechanical releasing of said fixed and movable parts and therefore the hydraulic disconnection of said first and second couplings of said fixed and movable parts, respectively, with no need to be switched into said first position.

According to an embodiment, said mechanical constraint means comprise a lever, which can be switched by rotation, and catching and engaging means, wherein the switching of said lever into said second position translates into the reciprocal progressive engaging of said lever and of said catching and engaging means and into the mechanical constraining of said fixed and movable parts.

According to an embodiment, said lever defines an engaging surface, where the progressive reciprocal engaging of said engaging surface and said catching and engaging means during the switching of the lever into said second position translates into the mechanical constraining of said fixed and movable parts, and wherein with said lever in said second position said engaging surface is released from and not engaged by said catching and engaging means.

According to an embodiment, said lever comprises a plate or a cam, wherein said engaging surface is defined by a groove obtained in said plate or cam.

According to an embodiment, said groove comprises an end portion, wherein with said fixed and movable parts in reciprocal constraining condition and with said lever in said second switching position, said catching and engaging means are positioned at said end portion and may be released from said lever by translation along said end portion.

According to an embodiment, said connector comprises contrasting and checking means accommodated in said end portion of said groove, wherein said contrasting and checking means are fixed to said lever and adapted to contrast the translation of said catching and engaging means along said end portion of said groove and thus the reciprocal releasing of said lever and of said catching and engaging means.

According to an embodiment, said contrasting and checking means are adapted to be broken and partially removed from said end portion of said groove if they are subjected to a force of intensity higher than a predetermined intensity and greater than zero.

According to an embodiment, said lever is rotationally fixed to said fixed part, wherein said catching and engaging means are rigidly fixed to said movable part.

According to an embodiment, said connector comprises safety means adapted to protect the integrity of the hydraulic pipes of said first and second hydraulic circuits of said main operating machine and of said equipment, respectively.

According to an embodiment, said safety means comprise a fixed hook rigidly fixed to said movable part which can be engaged by a first end portion of flexible means, such as a cable, a chain or the like, the second end portion of said flexible means being adapted to be fixed, for example, to said main operating machine.

According to an embodiment, said first and second couplings are of the type wherein the hydraulic connection of said first and second couplings also implies a mechanical constraint of said first and second couplings.

The present invention further relates to an operating machine comprising at least one hydraulic circuit, said machine comprising an end part constituted by the fixed part of a connector according to one of the embodiments summarized above.

According to an embodiment, said operating machine is equipped with a piece of equipment comprising a second own hydraulic circuit, wherein the end part of said second hydraulic circuit consists of a movable part of a connector according to one of the claims summarized above.

Further possible embodiments of the present invention are defined in the claims.

BRIEF DESCRIPTION OF THE DRAWINGS

Hereinafter, the present invention will be explained by means of the following detailed description of the embodiments depicted in the drawings. However, the present invention is not limited to the embodiments described hereinafter and depicted in the drawings; on the contrary, all the variants of the embodiments described below and depicted in the drawings which will become apparent to those skilled in the art fall within the scope of the invention.

In the drawings.

DETAILED DESCRIPTION OF THE PRESENT INVENTION

The present invention is adapted to be applied to the case of connector assemblies of the multiple connection type, this being the reason why hereinafter the present invention will be explained with reference to a connection assembly of the multiple connection type. Furthermore, the present invention is adapted to be advantageously applied in the case of connector assemblies equipped with couplings which each provide for an individual mechanical connection, e.g. of the type with self-retaining device, typical of manual couplings, i.e. for example wherein the male coupling provides for a connection by means of a ball crown and respective coupling groove, the balls being intended to engage a closing ring of the female coupling.

The possible applications of the present invention are therefore not limited either to the connectors of the multiple connection type or to those equipped with individual mechanical constraint (the self-retaining device according to the above).

Figure 1:
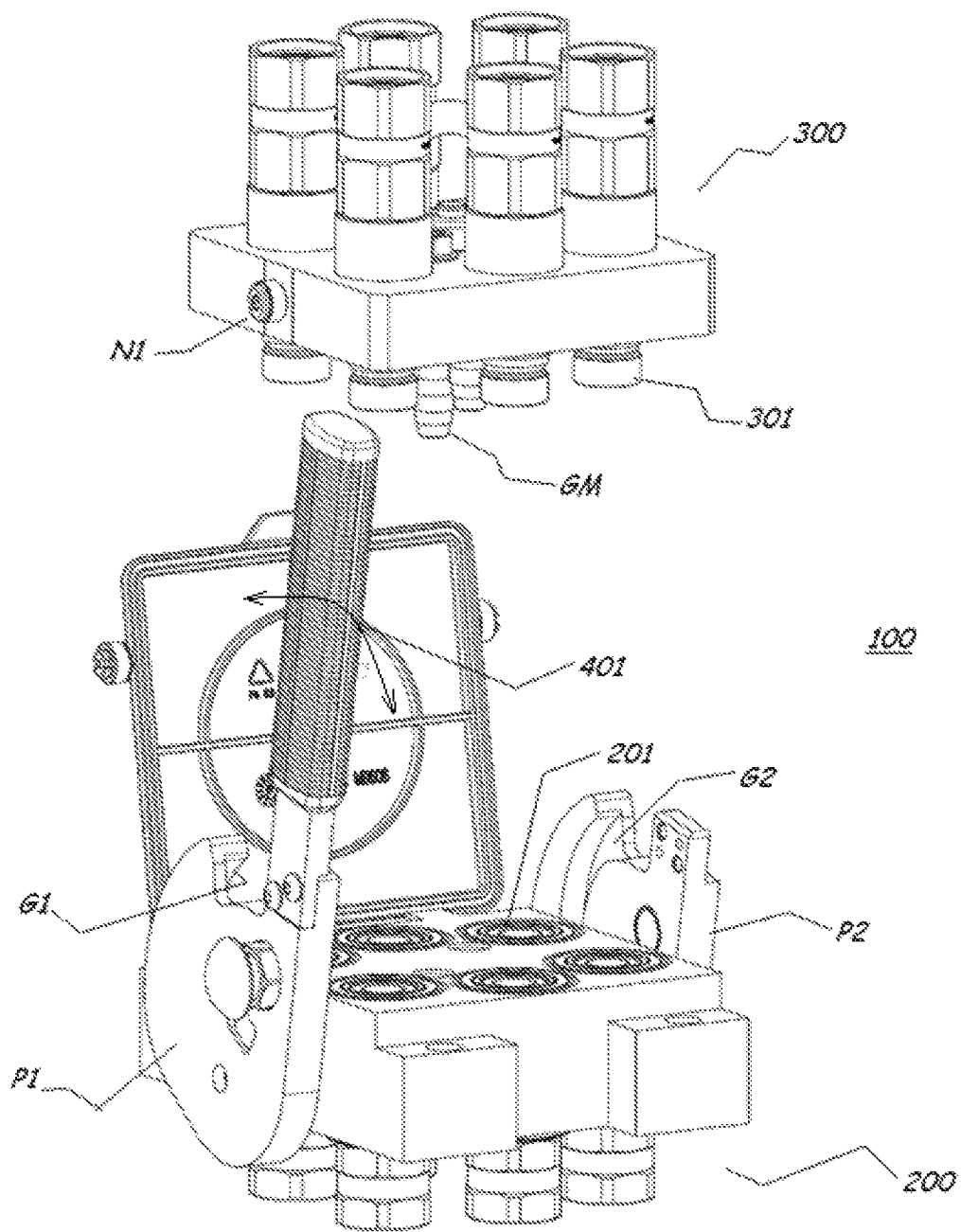
FIGS. 1 to 3 each show a perspective view of a connector assembly and/or of component parts of a connector assembly according to the prior art.
Figure 2:
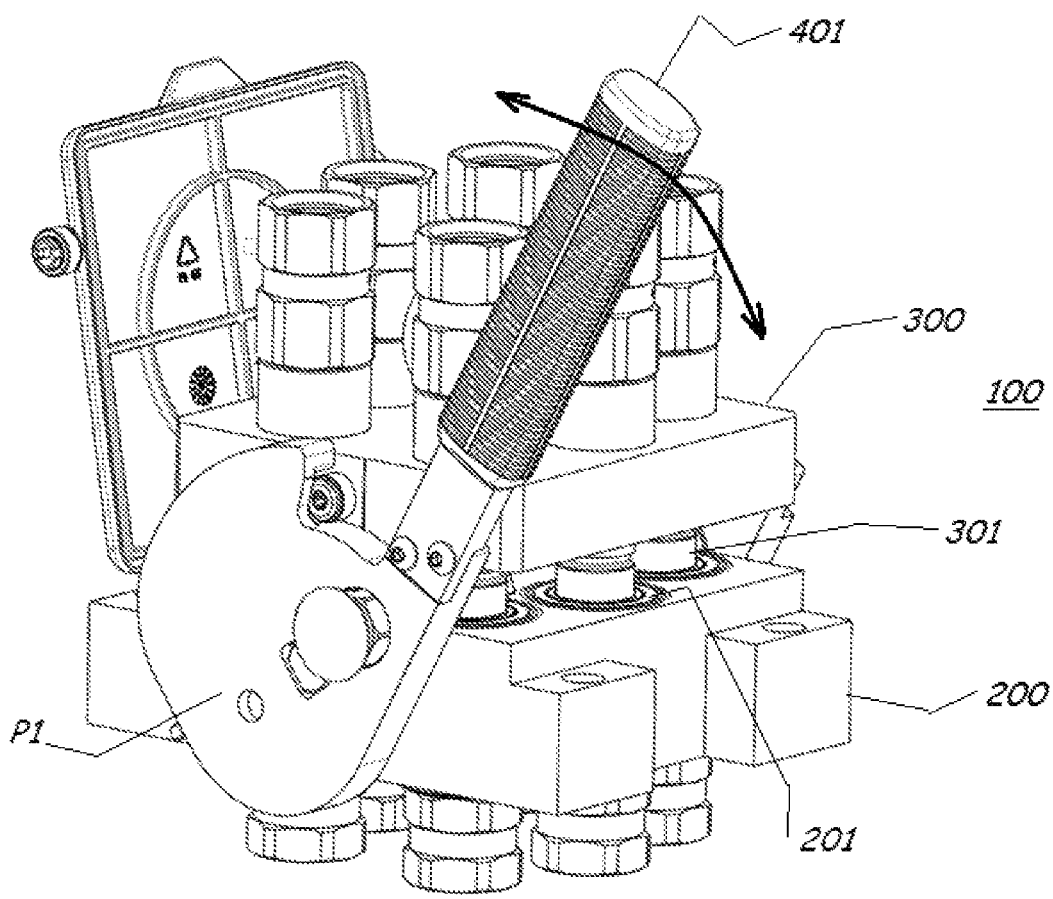
Figure 3:
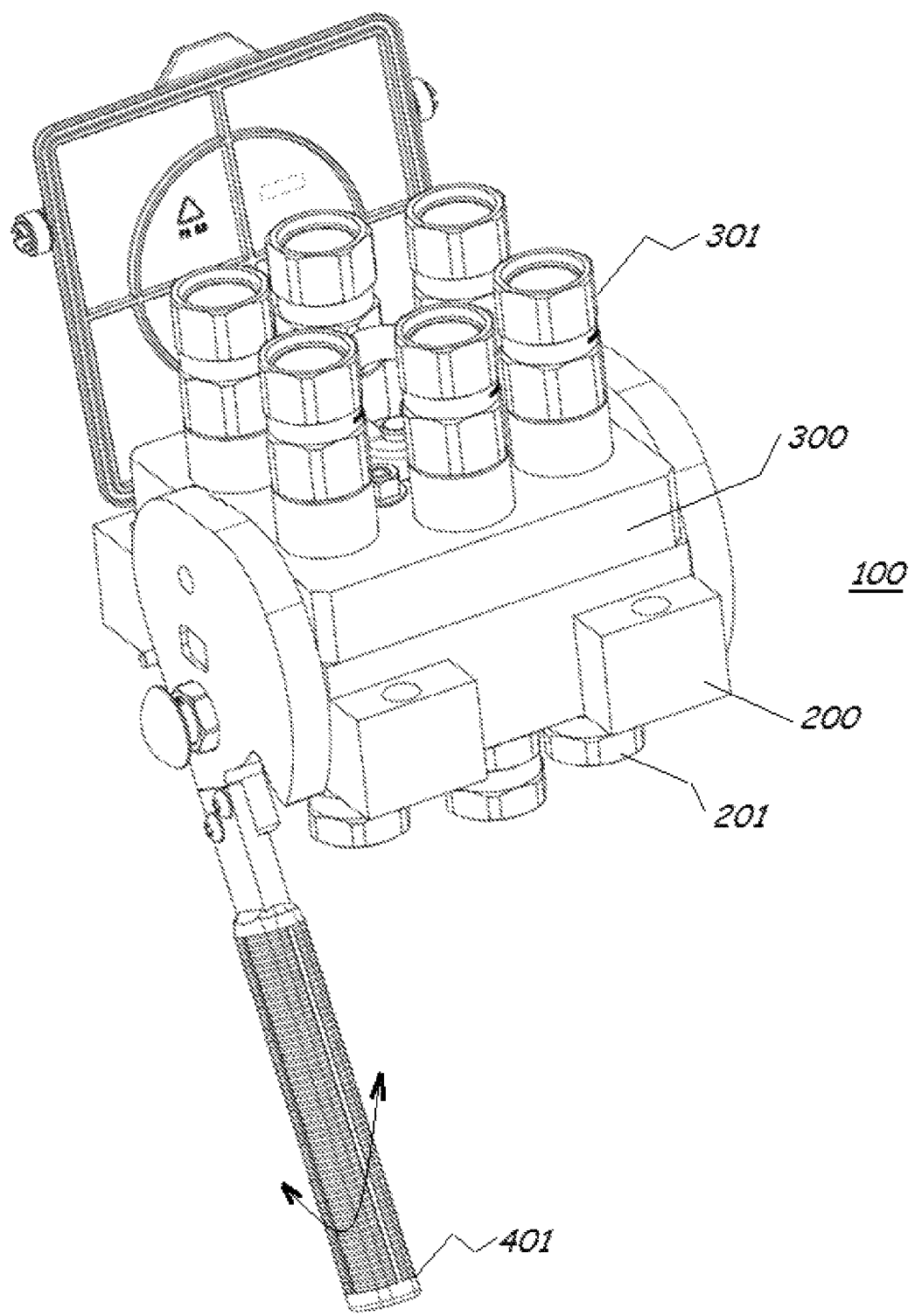
Figure 4:
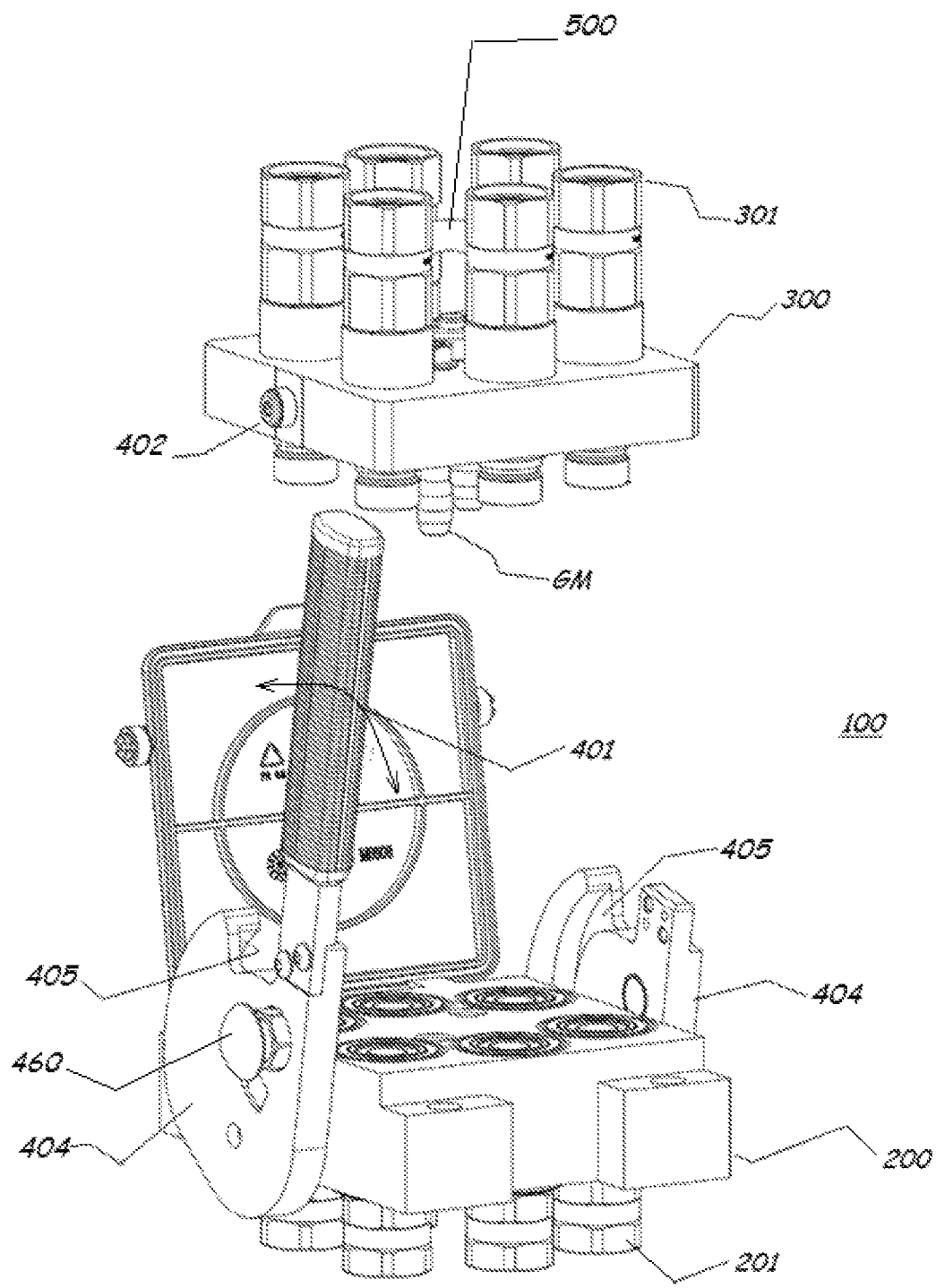
FIGS. 4 to 6 each show a perspective view of a connector assembly and/or of component parts of a connector assembly according to an embodiment of the present invention.
Figure 5:
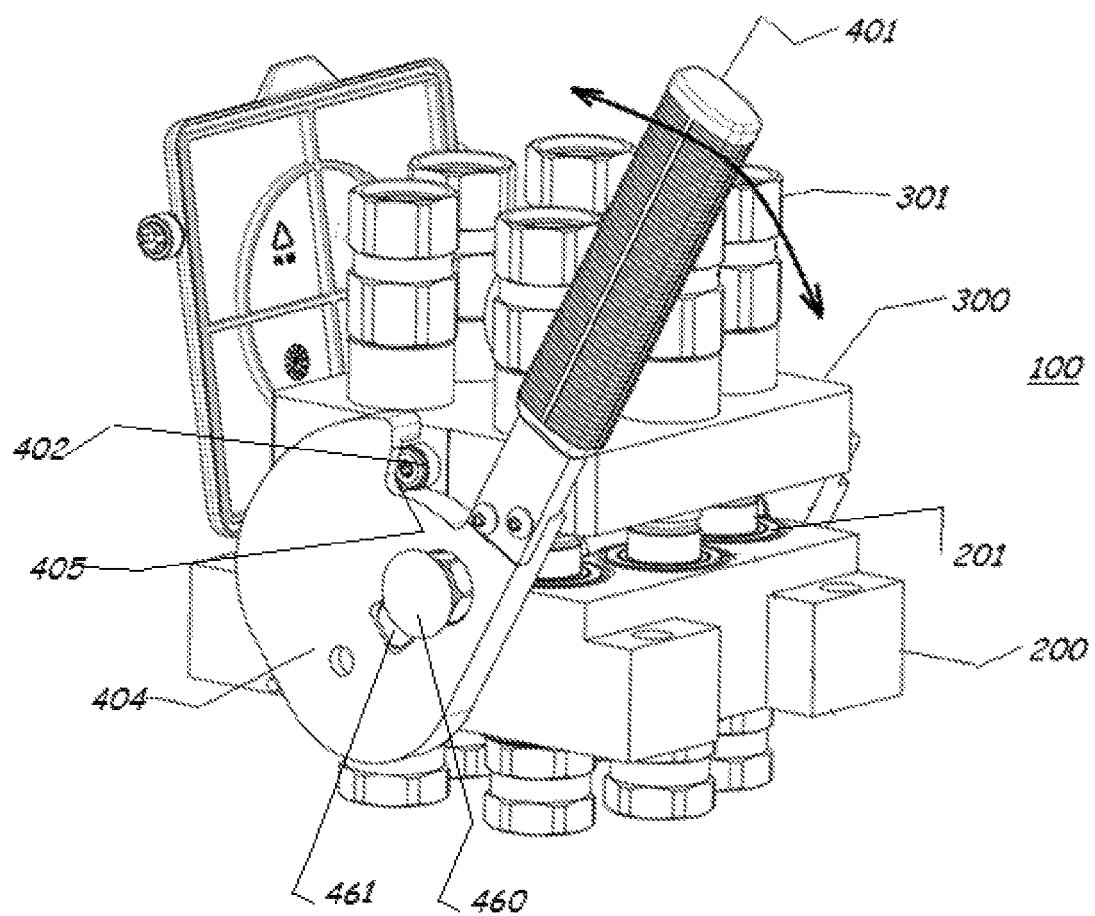
Figure 6:
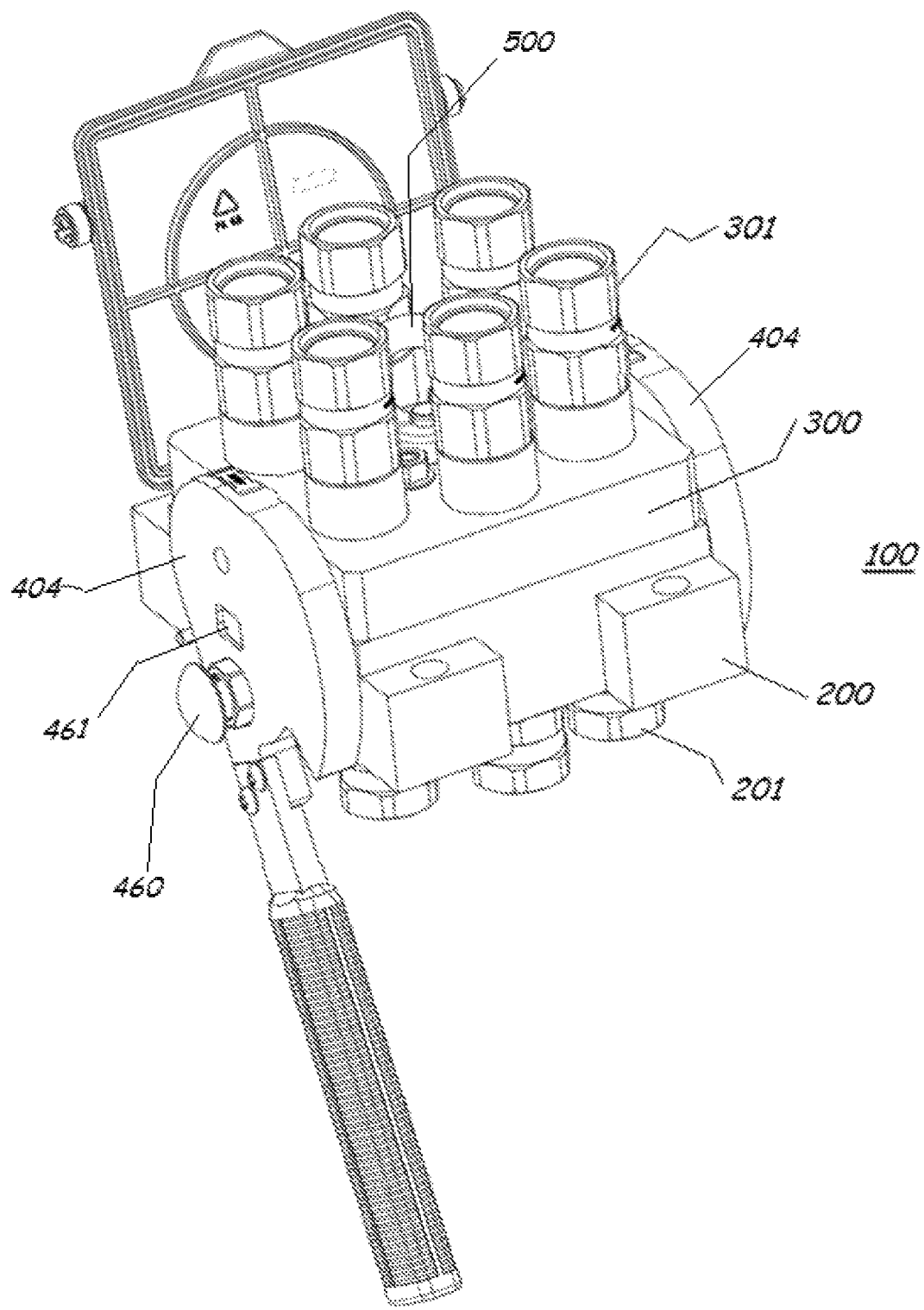

In the embodiment of the connector assembly according to the present invention depicted in FIGS. 4 to 6, the main component parts of the connector assembly 100 are in common and substantially correspond to those of a connector assembly according to the prior art (FIGS. 1 to 3). Indeed, in the embodiment in FIGS. 4 to 6, the connector assembly 100 comprises a movable part 300 with couplings 301, and a fixed part 200 with couplings 201. The fixed part 200 comprises a lever 401, the rotation of which translates into the rotation in the same sense of rotation of two plates or cams 404, wherein each of the two plates or cams defines an engaging groove 405. Furthermore, the movable part 300 comprises catching means 402 (substantially two pins or pawls) adapted to be engaged each in a corresponding groove 405 during the rotation of the lever 401. The mechanical connection and disconnection methods of the movable part 300 and of the fixed part 200 substantially mimic those of a connector assembly according to the prior art and may therefore be summarized briefly as follows.

With the lever 401 and the plates or cams 404 in the position in FIG. 4 (first end or limit stop position of the lever 401), the movable part 300 is approached (in practice positioned frontally or in all cases made to correspond and/or mate) with the fixed part 200, being careful to position each coupling 301 at the corresponding coupling 201; this operation is facilitated by guide means Gm (protruding pins) and Gf (corresponding housings or seats, not depicted) respectively of the movable part 300 and of the fixed part 200, the reciprocal engaging of which translates into the correct positioning of the movable part 300 and of the fixed part 200. With the movable part 300 and fixed part 200 positioned as described above, the rotation of the lever 401 away from the first limit stop position in FIG. 1 (and thus clockwise with respect to FIGS. 4 and 5), results in the pawls 402 being engaged by the engaging grooves 405 of the plates or cams 404, respectively. It is worth noting that each groove 405 is in practice defined and obtained in the thickness of the corresponding plate or cam 404 (FIGS. 7 and 8), wherein the groove 405 extends into the thickness of the plate or cam 404 from the surface of the plate or cam 404 facing towards the couplings 201 and 301, wherein the depth of the groove 405 is smaller than the thickness of the plate or cam 404, and wherein each groove 405 defines a first contrasting and engaging surface 403 and a second contrasting and engaging surface opposite to said first contrasting and engaging surface 403. The rotation of the lever 401 away from its first limit stop position in FIG. 4 thus translates into a push exerted by the first contrasting and engaging surfaces 403 on the respective pawls 402, and thus on the entire movable part 300, which is thus progressively approached to the fixed part 200.

Indeed, as shown, the further rotation of the lever 401 moving further away from the first limit stop position and to the reaching of the second limit stop position in FIG. 6 (until the second limit stop position is reached), translates, due to the conformation of the grooves 405, each defining the aforesaid first contrasting and engaging surface 403 with an arc or cam development, into the definitive approach of the movable part 300 and fixed part 200 and into the consequent hydraulic connection of the couplings 301 and 302, wherein in the reciprocal position of FIG. 6, the movable part 300 and the fixed part 200 are mechanically constrained to each other.

Obviously, the releasing of the movable part 300 from the fixed part 200 may occur by re-switching the lever 401 from the second limit stop position (FIG. 6) to the first limit stop position (FIG. 4). Indeed, the rotation of the lever 401 away from the second limit stop position (and thus anticlockwise with respect to the FIGS. 4 to 6) until the first limit stop position in FIG. 4 is reached, translates, due to the conformation of the grooves 405, each defining the aforesaid second contrasting and engaging surface 408, also with arc or cam development, in a push exerted by the second contrasting and engaging surface 408 onto the respective pawls 402 and thus on the entire movable part 300, which is thus progressively moved away from the fixed part 200, wherein with the lever 401 in the first limit stop position, and thus with the pawls 402 each at the end portion of the respective groove 405, and with each of said grooves 405 facing upwards, the movable part 300 is practically released from the fixed part 200.

Furthermore, as depicted, the fixed part 200 comprises safety means adapted to prevent the accidental and undesired switching of the lever 401, from both the first limit stop position towards the second limit stop position and from the second limit stop position towards the first limit stop position.

Said safety means substantially comprise a locking and releasing mechanism (substantially known in itself and thus not depicted or described in detail below) which can be switched between a first locking configuration, in which the fixed part 200 and at least one of the two plates or cams 404 are reciprocally constrained, and an unlocking configuration, in which the fixed part and the plates 404 are reciprocally released. Furthermore, the switching of the locking and unlocking mechanism is obtained by means of a locking and unlocking button 460 (of the respective mechanism), wherein the switching of the mechanism from the first configuration to the second configuration is obtained by pressing the button 460. Practically, with the lever 401 in its first limit stop position (FIG. 4), at least one of the plates 404 and the fixed part 200 are reciprocally constrained due to the automatic action of the locking and unloading mechanism), so that the switching of the lever 401 from the first limit stop position toward the second limit stop position is subordinated to the preventive switching of the mechanism from the first configuration to the second configuration by pressing on the button or on the knob 460. In the same manner, with the lever 401 in its second limit stop position (FIG. 6), the at least one plate 404 and the fixed part 200 are reciprocally constrained (also in this case, due to the automatic action of the locking and unloading mechanism), so that the switching of the lever 401 from the second limit stop position to the first limit stop position is subordinated to the preventive switching of the mechanism from the first configuration to the second configuration by pressing either on the button or on the knob 460.

It is further worth noting that, as depicted in the figures (in particular in FIG. 8 bis), the two plates 404 are reciprocally constrained by means of a rotation shaft 462 which extends along a corresponding housing of the fixed part 200, and the opposite ends of which, appropriately shaped, engage, corresponding housings shaped in corresponding manner 461 of the two plates 404, wherein the rotation of a plate 404 by means of the lever 401 translates into the simultaneous rotation of the shaft 462 and of the second plate 404. On the contrary, with one of the two plates 404 locked by the locking mechanism, the second plate 404 will also be locked and the two plates 404 may be turned simultaneously, also only by means of the preventive switching of the locking mechanism from the first configuration to the second configuration according to the methods summarized above.

However, as mentioned, the connector assembly according to the present invention comprises a solution adapted to allow the reciprocal releasing of the movable part 300 from the fixed part 200 without preventive switching of the lever 401 from the second limit stop position in the first limit stop position. Said solution comprises an innovative configuration of the grooves 405, wherein hereinafter since the grooves 405 are correspondingly shaped, only one of the two grooves 405 will be described for the sake of conciseness.

Figure 7:
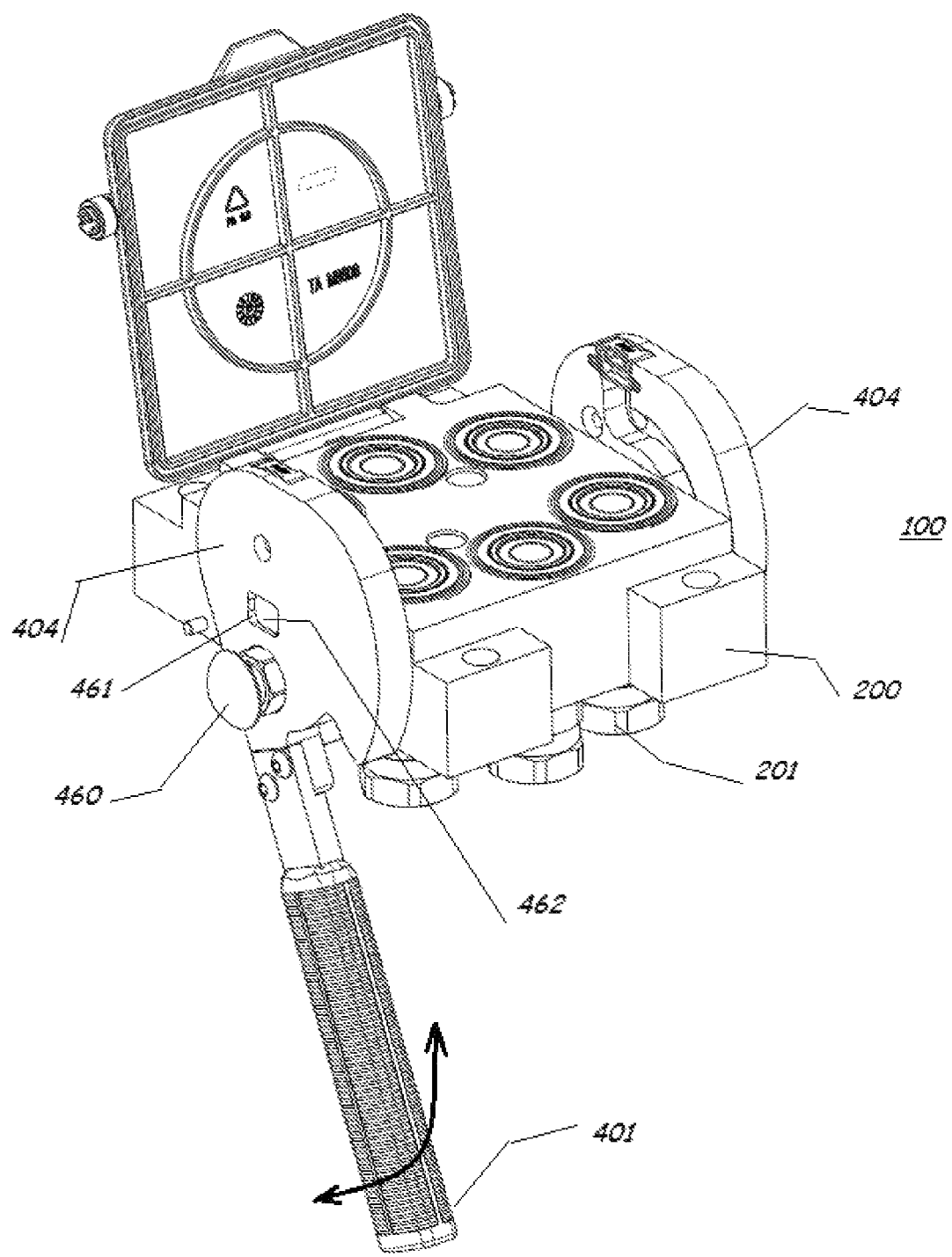
FIGS. 7 to 10 each show a perspective view of details of a connector assembly according to an embodiment of the present invention.
Figure 8:
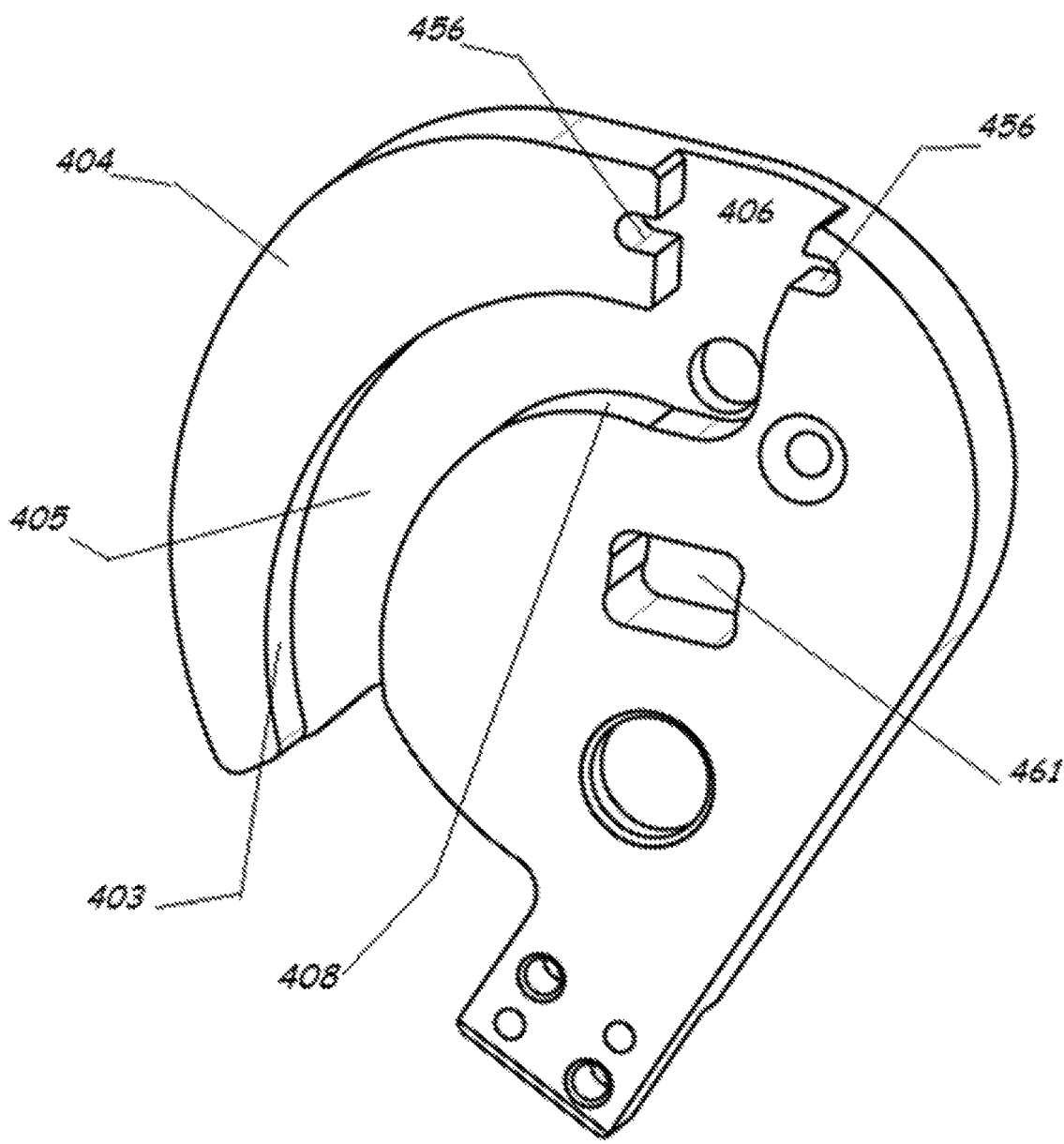
Figure 9:
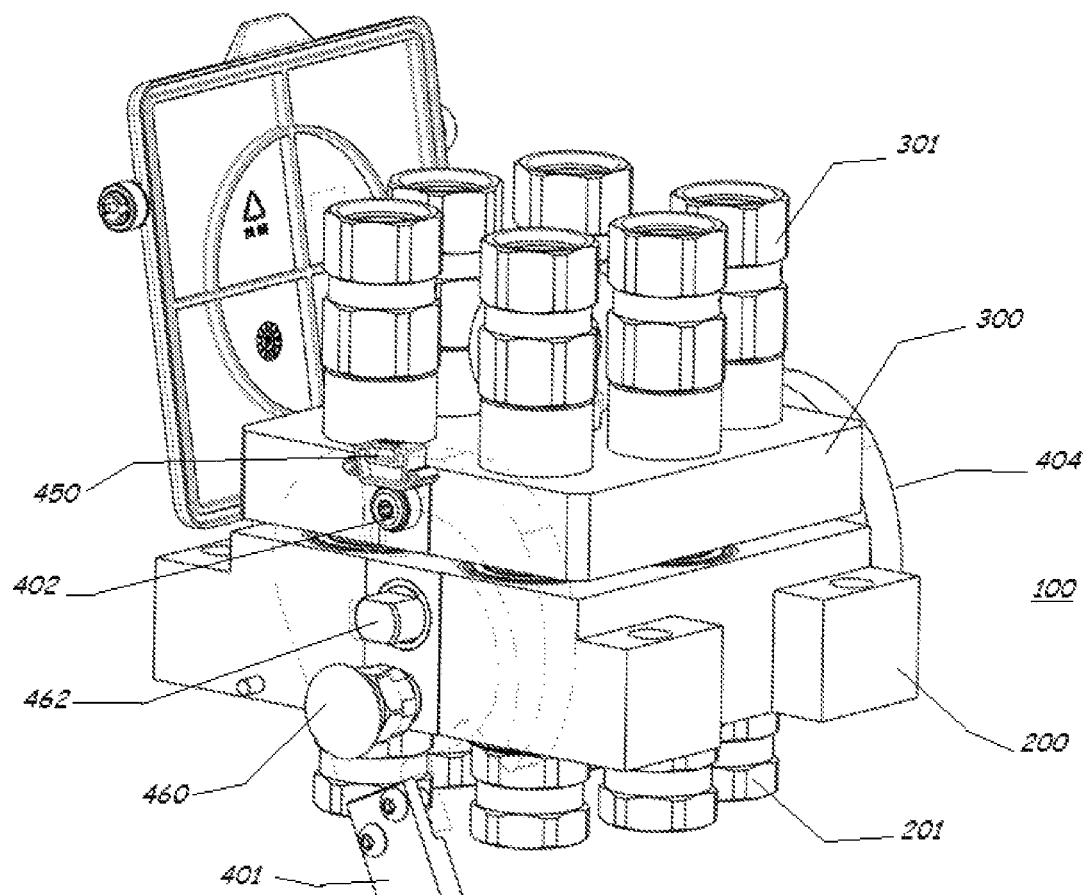
Figure 10:
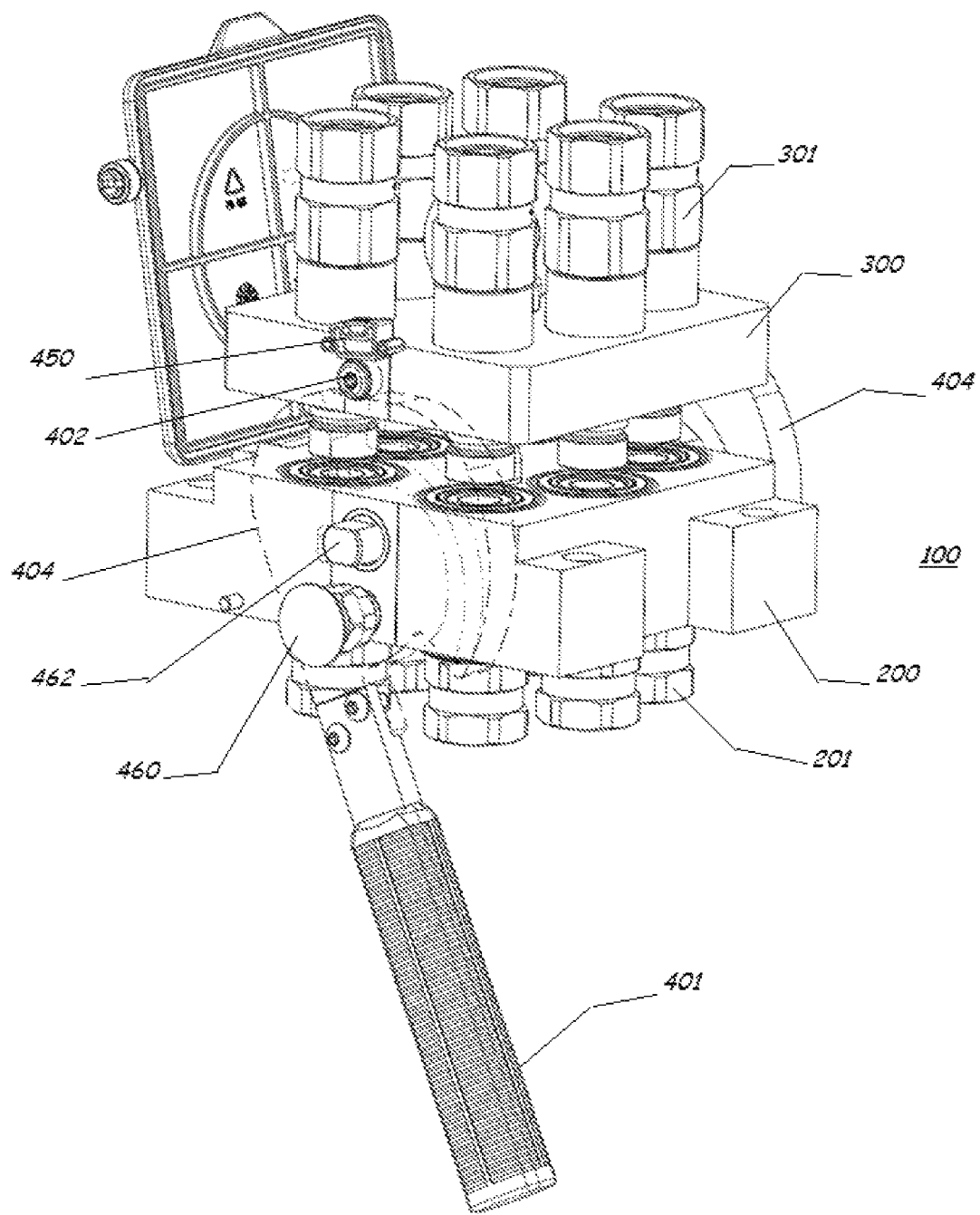

As depicted in FIGS. 7 and 8, the illustrated groove 405 comprises an end portion 406 which extends to the outer edge of the lever 404 and thus makes the part of the groove 405 with the arc or cam development communicate with the outside of the lever 404. From the above, it can be further inferred that with the movable part 300 and the fixed part 200 in reciprocal constraining conditions (FIG. 6), and thus with the lever 401 in its second limit stop position, each of the pawls 402 is positioned at the end portion 406 of the respective groove 405. It can therefore be inferred that the movable part 300 can be moved away from the fixed part 200 by simple pulling (or also pushing) on the movable part 300, wherein in the case of pulling or pushing on the movable part 300 away from the fixed part 200, the releasing of the movable parts 300 and 200 is possible because the pawls 402 can translate into the end parts or portions 406 of the respective grooves 405 and thus exit from the grooves themselves 405. Therefore, in the case of a front loader applied to a farming tractor, and thus with the respective hydraulic circuits connected by means of a connector assembly according to the present invention, in particular with the fixed part 200 and the movable part 300 in the reciprocal constraining condition of FIG. 6, the accidental detachment of the loader would translate into a pull action exerted on the hydraulic pies, wherein the pulling of the hydraulic pipes would translate into a pulling applied on the movable part 300, and thus ultimately into the releasing of the movable part 300 from the fixed part 200 according to the methods summarized above, and with no risk of breakage or damage of said hydraulic pipes.

According to a further embodiment of the present invention, contrasting and checking means are further included, adapted on one hand to contrast the releasing of the movable part 300 from the fixed part 200, and to make it possible only if a force—pulling or pushing of predetermined intensity is exerted or applied on the movable part 300, and on the other hand to indicate the even only partial releasing of the movable part 300 from the fixed part 200.

Said contrasting and checking means substantially comprise an insert, for example but not necessarily made of plastic material, 450, indeed inserted in the end portion 406 of the groove 405. For this purpose, the insert 450 comprises two opposite side protrusions 455, each accommodated in a housing 456 defined by said end portion 406. It can thus be inferred that the translation of the pawl 402 along the portion 406 and towards the outlet of said portion 406, translates into a push applied by the pawl 402 against the insert 450, and thus into the at least partial exiting of the insert 450 from the end portion 406 as a consequence of the breakage or at least deformation of the insert 450, wherein the absence of the insert or at least of its repositioning with respect to the original starting position are indicative of the at least partial releasing of the movable part 300 from the fixed part 200 and thus of the absence of hydraulic connection or at least of an anomalous hydraulic connection.

Furthermore, the insert 450 confers stability to the reciprocal constraining condition between the movable part 300 and the fixed part 200, indeed where the releasing of the movable part 300 and fixed part 200 according to the methods described above, and without switching the lever 401, is possible only in case of force acting on the movable part 300 (pulling or pushing or resultant thereof) of sufficient intensity to interrupt or deform or remove the insert 450.

Finally, as depicted, according to a further embodiment of the present invention, the movable part 300 is equipped with safety means, in practice with an eyelet or hook 500 adapted to be engaged by the first end portion of pulling means (e.g. a strap, a chain or similar means, not shown), the second end portion of which may be, for example, fixed to the equipment. So assuming in particular a steel strap interposed between the eyelet or hook 500 and the equipment, it is worth noting that by appropriately choosing the length of the strap, in case of accidental detachment, the strap would be pulled before the hydraulic pipes, so the pulling on the movable part 300 would be applied to the strap rather than to the hydraulic pipes, with further increased safety preventing damage to the hydraulic pipes in any manner.

It has therefore been demonstrated by means of the above detailed description of the embodiments of the present invention depicted in the drawings that the present invention allows to achieve the predetermined objects by overcoming the drawbacks found in the prior art.

In particular, the present invention allows to release the movable part 300 and the fixed part 200 of a connector without needing to switch the lever 401, protecting the integrity of the hydraulic pipes in this manner. Furthermore, the present invention allows to check the releasing condition of the movable and fixed part of the connector, as well as the anomalous or partial constraining condition and thus anomalous or incomplete hydraulic connection.

Although the present invention has been explained above by means of a detailed description of the embodiments depicted in the drawings the present invention is not limited to the embodiments described above and depicted in the drawings. On the contrary, all the modifications and/or variants of the embodiments described above and depicted in the drawings which will appear obvious and immediate to those skilled in the art fall within the scope of the present invention.

For examples, although in the embodiments described above with reference to the drawings the movable part 300 and the fixed part 200 comprise a plurality of couplings 301 and respectively 201, the number of couplings may vary according to the needs and/or the age or circumstances, from a minimum of one to a maximum which depends on the type of hydraulic circuits to be connected. Furthermore, the lever may be rotationally fixed either to the fixed part 200 (as shown in the examples described and shown) or to the movable part 300, where in this case the engaging or contrasting means 402 will be on the side of the fixed part.

Moreover, the couplings 201 and 301 may be of any type, e.g. but not necessary but of the type comprising a self-retaining device (reciprocal between male coupling and female coupling), in particular with a ball crown and respective housing groove of the male coupling and lock ring in the female coupling, the couplings with self-retaining device conferring greater stability to the mechanical constraint between fixed part 200 and movable part 300.

The scope of the present invention is thus defined by the appended claims.

The invention claimed is:

1. A hydraulic and/or pneumatic connector, said connector comprising a fixed part adapted to constitute an end part of a first hydraulic circuit of a main operating machine and to be fixed to said main operating machine, said fixed part comprising at least one first male or female hydraulic coupling, said connector comprising a movable part adapted to constitute an end part of a second hydraulic circuit of a piece of equipment, said movable part comprising at least one second hydraulic coupling, respectively either female or male, wherein said at least one first hydraulic coupling of said fixed part and said at least one second hydraulic coupling of said movable part are adapted to be hydraulically connected so as to achieve hydraulic connection between said first and second hydraulic circuits of said main operating machine and said equipment, respectively, said connector comprising mechanical constraint means which can be switched between a first position and a second position, wherein the switching of said mechanical constraint means to said second position results in mechanically constraining of said fixed part and said movable part and in hydraulic connection between said first coupling and said second coupling of said fixed part and said movable part, respectively, and wherein the switching of said constraint means to said first position enables mechanically releasing of said fixed part and said movable part and hydraulically disconnecting of said first coupling and said second coupling of said fixed part and said movable part, respectively, wherein said mechanical constraint means are shaped so as to allow, in said second position, the mechanical releasing of said fixed part and said movable part and therefore the hydraulic disconnection of said first coupling and said second coupling of said fixed part and said movable part, respectively, with no need to be switched to said first position, wherein said mechanical constraint means comprise a lever, which can be switched by rotation, and catching and engaging means, wherein the switching of said lever into said second position results in progressive reciprocal engaging of said lever and said catching and engaging means and in the mechanical constraining of said fixed part and said movable part, wherein said lever defines an engaging surface, wherein the progressive reciprocal engaging of said engaging surface and said catching and engaging means during the switching of said lever to said second position results in the mechanical constraining of said fixed part and said movable part, wherein, with said fixed part and said movable part in a reciprocal constraining condition and with said lever in said second position, said engaging surface is released and not engaged by said catching and engaging means, wherein said lever comprises a plate, wherein said engaging surface is defined by a groove formed in said plate, wherein said groove comprises an end portion, and wherein with said fixed part and said movable part in said reciprocal constraining condition and with said lever in said second switching position, said catching and engaging means are positioned at said end portion and may be released from said lever to translate along said end portion, characterized in that said connector comprises contrasting and checking means accommodated in said end portion of said groove, and in that said contrasting and checking means are fixed to said lever and adapted to oppose the translation of said catching and engaging means along said end portion of said groove and thus the releasing of said catching and engaging means from said lever.

2. The connector according to claim 1, characterized in that said contrasting and checking means are adapted to be broken and partially removed from said end portion of said groove if subjected to a force of intensity higher than a predetermined intensity and greater than zero.

3. The connector according to claim 1, characterized in that said movable part comprises an eyelet or hook rigidly fixed thereto.

4. The connector according to claim 3, characterized in that said eyelet or hook is adapted to be engaged by a first end portion of flexible means, the second end portion of said flexible means being adapted to be fixed to said main operating machine.

5. The connector according to claim 4, wherein said flexible means comprises a cable or a chain.

6. The connector according to claim 1, characterized in that said first coupling and said second coupling are of a type for which hydraulic connection of said first coupling and second coupling entails a mechanical constraint to said first coupling and said second coupling.

7. The connector according to claim 1, characterized in that said lever is rotationally fixed to said fixed part, and in that said catching and engaging means are rigidly fixed to said movable part.

8. The connector according to claim 1, further comprising safety means adapted to protect the integrity of said first and second hydraulic circuits of said main operating machine and of said equipment, respectively.

9. An operating machine including at least one first hydraulic circuit, characterized in that said first circuit comprises an end part comprising a fixed part adapted to be fixed to said operating machine, said fixed part comprising at least one first male or female hydraulic coupling, wherein said at least one first hydraulic coupling is adapted to be hydraulically connected to a second female or male hydraulic coupling of a movable part that is adapted to constitute an end part of a second hydraulic circuit of a piece of equipment, wherein the connection of the first and second hydraulic couplings achieves hydraulic connection between said first and second hydraulic circuits of said main operating machine and said equipment, respectively, said operating machine comprising mechanical constraint means which can be switched between a first position and a second position, wherein the switching of said mechanical constraint means to said second position results in mechanically constraining of said fixed part and said movable part and in hydraulic connection between said first coupling and said second coupling of said fixed part and said movable part, respectively, and wherein the switching of said constraint means to said first position enables mechanically releasing of said fixed part and said movable part and hydraulically disconnecting of said first coupling and said second coupling of said fixed part and said movable part, respectively, wherein said mechanical constraint means are shaped so as to allow, in said second position, the mechanical releasing of said fixed part and said movable part and therefore the hydraulic disconnection of said first coupling and said second coupling of said fixed part and said movable part, respectively, with no need to be switched to said first position,
wherein said mechanical constraint means comprise a lever, which can be switched by rotation, wherein the switching of said lever into said second position results in progressive reciprocal engaging of said lever and catching and engaging means and in the mechanical constraining of said fixed part and said movable part, wherein said lever defines an engaging surface, wherein the progressive reciprocal engaging of said engaging surface and said catching and engaging means during the switching of said lever to said second position results in the mechanical constraining of said fixed part and said movable part, wherein, with said fixed part and said movable part in a reciprocal constraining condition and with said lever in said second position, said engaging surface is released and not engaged by said catching and engaging means,
wherein said lever comprises a plate, wherein said engaging surface is defined by a groove formed in said plate, wherein said groove comprises an end portion, and wherein with said fixed part and said movable part in said reciprocal constraining condition and with said lever in said second switching position, said catching and engaging means are positioned at said end portion and may be released from said lever to translate along said end portion, characterized in that said operating machine comprises contrasting and checking means accommodated in said end portion of said groove, and in that said contrasting and checking means are fixed to said lever and adapted to oppose the translation of said catching and engaging means along said end portion of said groove and thus the releasing of said catching and engaging means from said lever.

10. The operating machine according to claim 9, said operating machine being equipped with the equipment comprising said second hydraulic circuit, wherein the end part of said second hydraulic circuit comprises the movable part.

* * * * *